United States Patent
Hara

(10) Patent No.: US 6,524,450 B1
(45) Date of Patent: Feb. 25, 2003

(54) PRODUCTION SYSTEM OF ELECTROLYZED WATER

(75) Inventor: Yasuo Hara, Shimane-ken (JP)

(73) Assignee: Hoshizaki Denki Kabushiki Kaisha, Aichi-ken (JP)

( * ) Notice: Subject to any disclaimer, the term of this patent is extended or adjusted under 35 U.S.C. 154(b) by 84 days.

(21) Appl. No.: 09/665,318

(22) Filed: Sep. 19, 2000

(51) Int. Cl.[7] .................... B23H 3/02; C25B 15/00; C25D 17/00; C25F 7/00
(52) U.S. Cl. ................ 204/228.3; 204/229.6; 204/230.5; 204/660; 204/661
(58) Field of Search ................ 205/628, 633, 205/637; 204/228.1, 228.3, 230.5, 229.6, 660, 661

(56) References Cited

U.S. PATENT DOCUMENTS

| | | | | |
|---|---|---|---|---|
| 3,925,184 A | * | 12/1975 | Cave | 204/218 |
| 5,728,274 A | * | 3/1998 | Kamitani et al. | 204/229.6 |
| 5,798,028 A | * | 8/1998 | Tsuchikawa et al. | 204/228.1 |

FOREIGN PATENT DOCUMENTS

| JP | 07251177 A | 10/1995 |
|---|---|---|
| JP | 09192666 A | 7/1997 |

* cited by examiner

Primary Examiner—Nam Nguyen
Assistant Examiner—Wesley A. Nicolas
(74) Attorney, Agent, or Firm—Arent Fox Kintner Plotkin & Kahn

(57) ABSTRACT

In a production system of electrolyzed water A having an electrolyzer provided with electrodes 14, 15, each pair of inlet conduits 21, 22 and outlet conduits 31, 32, a pair of discharge conduits 41, 42 provided with faucets 43, 44; 45, 46 respectively, a flow passage changeover valve 50, each pair of drain conduits 61, 62 and drain valves 71, 72, a pair of flow quantity sensors 81, 82 and an electric control device 100, the electrodes 14, 15 are supplied with an electric power in response to a detection signal applied from the flow quantity sensors 81, 82 when the faucets 43, 44 or 45, 46 were opened, and simultaneously the drain valve 71 or 72 on the drain conduit 61 or 62 in connection to the discharge conduit 42 or 41 the faucets maintained in a closed condition is is opened. In the production system, the polarity of the electrodes 14, 15 and the position of the changeover valve 50 are switched over in a set condition, and only the position of the changeover valve 50 or the polarity of the electrodes 14, 15 is switched over in a specific condition so that clog in the discharge conduits is detected and informed by an indication lamp 103.

3 Claims, 6 Drawing Sheets

PRODUCTION SYSTEM OF ELECTROLYZED WATER

BACKGROUND OF THE INVENTION

1. Field of the Invention

The present invention relates to a production system of electrolyzed water in which fresh water such as city service water supplied under pressure is electrolyzed to produce electrolyzed water (alkaline water and acidic water).

2. Description of the Prior Art

Disclosed in Japanese Patent Laid-open Publication Nos. 7-251177 and 9-192666 is a production system of electrolyzed water of the type in which electrolyzed water is produced in an electrolyzer when a faucet provided on an outlet end of a discharge conduit is opened to discharge the electrolyzed water therethrough. As in the production system of electrolyzed water, there is not provided any washing means for the discharge conduit, the passage of the discharge conduit particularly for alkaline water becomes narrow due to scale adhered and deposited therein in use of a long period of time. It is, therefore, difficult to discharge the alkaline water in a good condition for a long period of time.

SUMMARY OF THE INVENTION

To solve the above problem, the present invention was made to provide a production system of electrolyzed water which includes an electrolyzer of the flow-down type having positive and negative electrodes respectively provided in a pair of electrode chambers subdivided by a partition membrane, a pair of inlet conduits connected to the electrode chambers of the electrolyzer for supplying treatment water into the electrode chambers, a pair of outlet conduits connected to the electrode chambers for discharging alkaline water and acid water produced in the electrode chambers, a pair of discharge conduits each provided with a faucet at their outlet ends, a flow passage changeover valve disposed between the outlet conduits and discharge conduits for switching over the flow passage of alkaline water and acid water discharged from the outlet conduits, a pair of drain conduits respectively bifurcated from the discharge conduits between the changeover valve and the faucets, a pair of drain valves provided on the drain conduits, a pair of flow quantify sensors provided on the inlet conduits for detecting a quantity of the treatment water flowing therethrough, control means for applying an electric power to the electrodes in response to a detection signal applied from the flow quantity sensors when at least one of the faucets on the discharge conduits was opened and opening the drain valve on the drain conduit bifurcated from the discharge conduit the faucet of which is closed, the control means being further arranged to switch over the polarity of the electrodes and the position of the changeover valve in a set condition and to switch over only the position of the changeover valve or the polarity of the electrodes in a specific condition, detection means for detecting clog in the discharge conduits when a quantity of treatment water detected by the flow quantity sensors is less than a predetermined quantity, and indication means for indicating the clog in the discharge conduits detected by the detection means.

When the faucet on either one of the discharge conduits is opened in the production system of electrolyzed water, a quantity of water flowing through the inlet conduit is detected by either one of the flow quantity sensors. In response to a detection signal from the flow quantity sensor, the electrodes are supplied with an electric power under control of the control means, and the drain valve on the drain conduit in connection to the discharge conduit closed at its faucet is opened. Thus, alkaline water and acid water are produced by electrolysis of the water supplied into the electrode chambers of the electrolyzer and discharged into the discharge conduits through the outlet conduits and changeover valve.

In operation of the production system of electrolyzed water, the polarity of the electrodes and the position of the changeover valve 50 are switched over under control of the control means in a set condition, and only the position of the changeover valve 50 or the polarity of the electrodes is switched over under control of the control means in a specifica condition. Accordingly, in a condition where the polarity of the electrodes and the position of the changeover valve are switched over at the same time, alkaline water is discharged through either one of the discharge conduits, while acid water discharged through the other discharge conduit. As a result, an amount of scale is deposited in the discharge conduit through which the alkaline water is continuously discharged. However, when only the position of the changeover valve or the polarity of the electrodes is switched over, the acid water is discharged through the discharge conduit through which the alkaline water was discharged before the position of the changeover valve or the polarity of the electrodes is switched over, while the alkaline water is discharged through the discharge conduit through which the acid water was discharged before the position of the changeover valve or the polarity of the electrodes is switched over. As a result, the scale deposited in the discharge conduits is dissolved and washed by the acid water after the position of the changeover valve or the polarity of the electrodes was switched over. This is useful to eliminate the scale deposited in the discharge conduits thereby to maintain the passage of the discharge conduits in a good condition. It is, therefore, apparent that if each discharge place of the alkaline water and acid water is changed from one of the discharge conduits to the other discharge conduit or vice versa, the alkaline water and acid water can be discharged in a good condition for a long period of time.

In addition, when the flow quantity of water detected by the flow quantity sensors is less than a predetermined quantity, a clog caused by the scale deposited in the discharge conduits, drain conduits and drain valves is detected by the detection means, and the indication means is activated to inform the user of the clog in the conduits and drain valve.

In a practical embodiment of the present invention the indication means may be replaced with alarm means for informing a user of the clog in the discharge conduits detected by the detection means. In addition, the production system of electrolyzed water may be further provided with means for prohibiting activation of the indication means or the alarm means until the production time of electrolyzed water becomes a predetermined time after only the position of the changeover valve or the polarity of the electrodes was switched over. In such a case, it is able to prevent useless activation of the indication means or the alarm means.

Furthermore, the indication means is replaced with a switchover means for switching over only the position of the changeover valve or the polarity of the electrodes when the clog in the discharge conduits is detected by the detection means. There is also provided a means for prohibiting activation of the switchover means until the production time of electrolyzed water becomes a predetermined time after the position of the changeover valve or the polarity of the electrodes is switched over. The alkaline water is discharged alternately through the discharge conduits at each time when the clog in the discharge conduits is detected. Thus, the scale deposited in the discharge conduits, drain conduits and drain valves can be automatically removed. This facilitates the maintenance management of the production system of electrolyzed water. In addition, as the activation of the switchover means is prohibited until the production time of electrolyzed water becomes the predetermined time after the position of the changeover valve or the polarity of the electrodes is switched over, useless operation of the switchover means can be avoided. In such a case, it is preferable that indication means for informing the user of the kind of electrolyzed water are provided adjacent the faucets on the discharge conduits. For example, a blue lamp may be provided adjacent the faucets capable of discharging the alkaline water, while a red lamp may be provided adjacent the faucets capable of discharging the acid water.

DESCRIPTION OF THE PREFERRED EMBODIMENT

Figure 1:
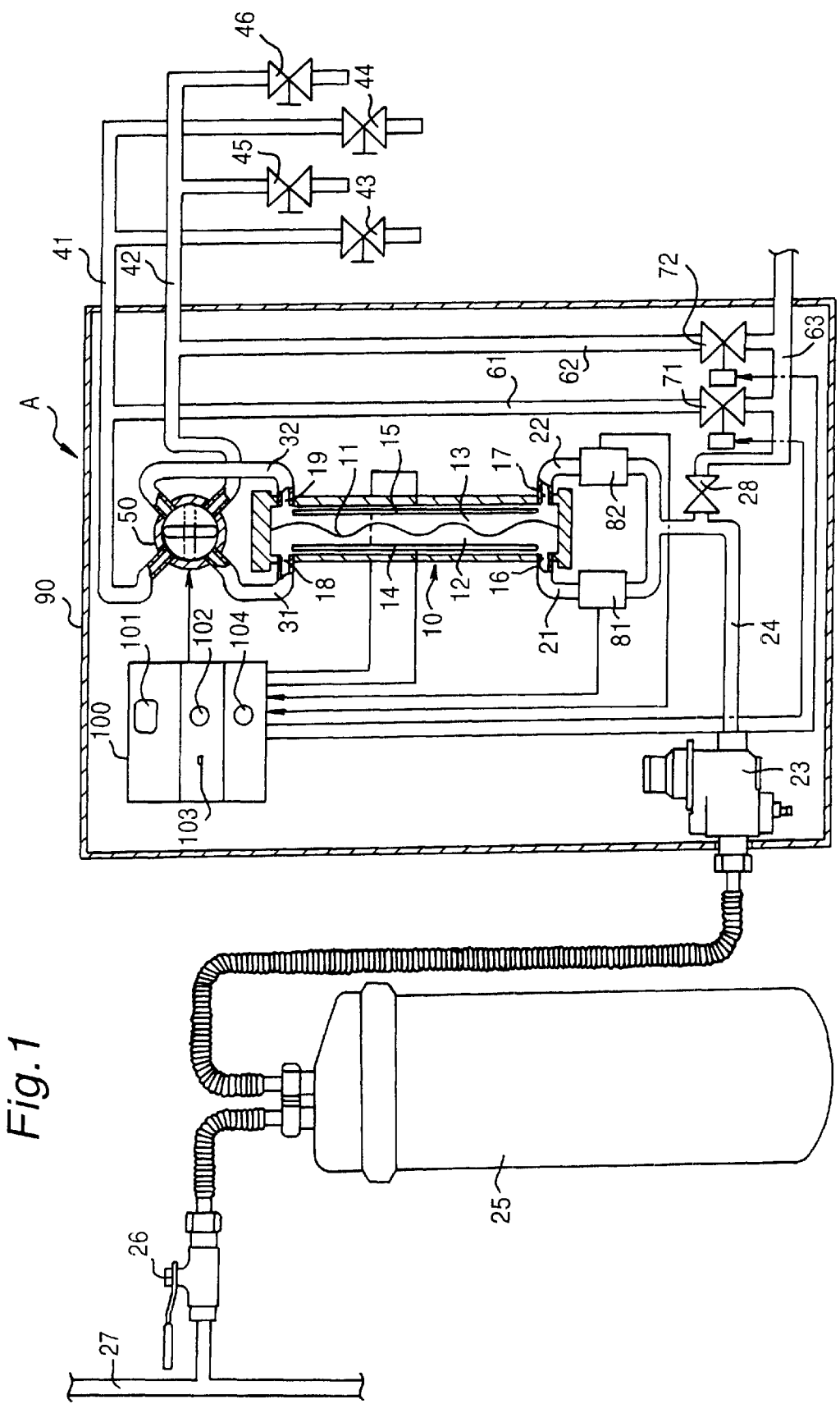
FIG. 1 is a schematic illustration of a practical embodiment of a production system of electrolyzed water in accordance with the present invention.

Hereinafter, a preferred embodiment of the present invention will be described with reference to the drawings. A production system of electrolyzed water A shown in FIG. 1 includes an electrolyzer 10, a pair of inlet conduits 21, 22, a pair of outlet conduits 31, 32, a pair of discharge conduits 41, 41, a flow passage changeover valve 50, a pair of drain conduits 61, 62, a pair of drain valves 71, 72, a pair of flow quantity sensors 81, 82 and an electric control device 100.

The electrolyzer 10 is in the form of a well-known electrolyzer of the flow-down type which includes positive and negative electrodes 14, 15 provided in a pair of electrode chambers 12, 13 and subdivided by a cation permeable partition membrane 11. The electrolyzer 10 is installed in a housing 90 of the production system of electrolyzed water A and is activated under control of the electric control device 100 to apply positive or negative DC voltage to the electrodes 14, 15 from a DC power source (not shown). The electrolyzer 100 has inlet ports 16, 17 in connection with inlet conduits 21, 22 and outlets ports 18, 19 in connection with the outlet conduits 31, 32. The inlet conduits 21, 22 are connected to a water supply conduit 24 to supply treatment water (city service water) into the electrode chambers 12, 13 of electrolyzer 10. The water supply conduit 24 is connected to a water purifier 25 through a pressure reduction valve 23 placed in the interior of housing 90 and is connected to a drain conduit 63 through a safety valve 28 in the form of a relief valve. The water purifier 25 is placed in the exterior of housing 90 and is connected to a city service water conduit 27 through a main cock 26.

The outlet conduits 31, 32 are arranged between the electrolyzer 10 and flow passage changeover valve 50 in the interior of housing 90 to discharge alkaline water and acidic water produced in the electrode chambers 12, 13 of electrolyzer 10 from the changeover valve 50. The discharge conduits 41, 42 are connected to the changeover valve 50 and extended outwardly from the housing 90 to introduce the alkaline water and acidic water from the changeover valve 50 to an appropriate place for use. The discharge conduits 41, 42 are provided with faucets 43, 44, 45, 46 at their outlet ends.

The flow passage changeover valve 50 is in the form of a changeover valve of the 4-port 2-position, type which is switched over to a first position or a second position by operation of an electric motor (not shown) under control of the electric control device 100 to selectively connect the outlet conduits 31, 32 to the discharge conduits 41, 42. The switchover position of changeover valve 50 is detected by a position sensor (not shown), and the electric control device 100 is applied with a detection signal from the position sensor.

The drain conduits 61, 62 are bifurcated from the discharge conduits 41, 42 respectively between the changeover valve 50 and faucets 43, 44, 45, 46 in the interior of housing 90 and connected to the main drain conduit 63. The drain valves 71, 72 provided on the drain conduits 61, 62 each are in the form of a normally closed electromagnetic valve which is activated under control of the electric control device 100. The flow quantity sensors 81, 82 are provided on the inlet conduits 21, 22 to detect an amount of water flowing therethrough, and the electric control device 100 is applied with a detection signal from the sensors 81, 28.

Figure 3:
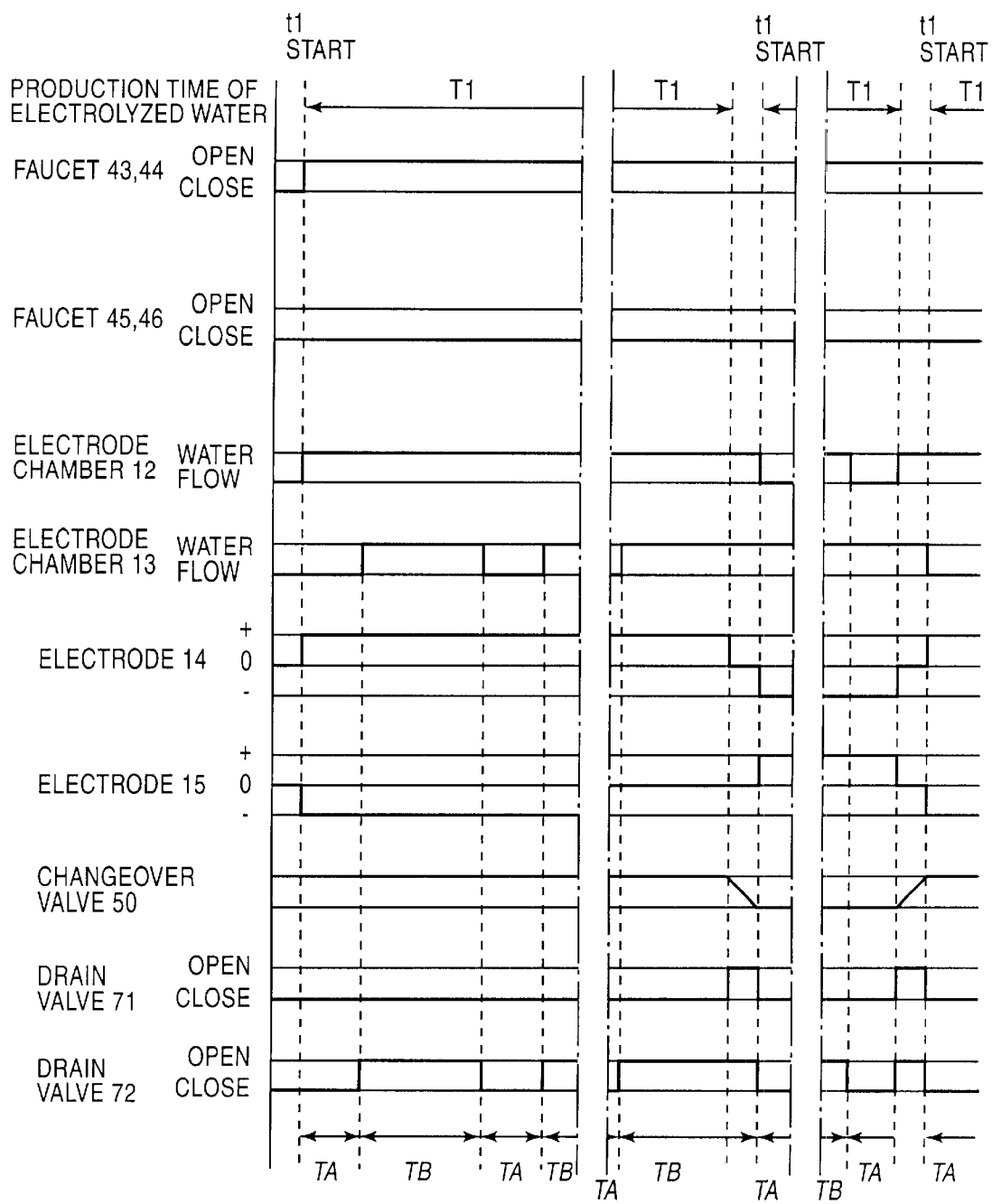
FIG. 3 illustrates an operation mode of the production system in use of only alkaline water or acid water.

The electric control device 100 is provided with a main switch 101 for enabling production of electrolyzed water in its on-position and for disabling the production of electrolyzed water in its off-position, a manual changeover switch 102, an indication lamp (or buzzer) 103 for informing a user of a changeover timing, and an alarm buzzer (or alarm lamp) 104, The electric control device 100 includes a microcomputer (not shown) provided to execute a control program for activating the electrodes 14, 15 in response to a detection signal applied from the flow quantity sensor 81 or 82 when the faucets 43, 44 or 45, 46 are opened and for intermittently maintaining the drain valve 71 or 72 of the drain conduit 61 or 62 in its closed position for a predetermined time T.A (about 10 seconds) and in its open position for a predetermined time TB (about 20 seconds) as shown in FIG. 3, a control program for switching over the polarity of electrodes 14, 14 (for inverting the polarity of electric power applied to the electrodes 14, 15) and for switching over the position of flow passage changeover valve 50 at each time when a production time t1 of electrolyzed water measured by an integration timer (not shown) becomes a predetermined time T1, a control program for switching over only the flow passage changeover valve 50 when the manual changeover switch 102 has been operated by the user (normally based on lighting of the indication lamp 103), and a program for opening the drain valve 71 or 72 when a production time t2 of electrolyzed water measured by an integration timer (not shown) for prohibiting production of the electrolyzed water becomes a predetermined time T2 after the flow passage changeover valve 50 was switched over, for determining whether or not a flow quantity Q detected by sensor 81 or 82 in a condition where the drain valve 71 or 72 is maintained in its open position is less than a predetermined value Q1 (for example, about 30%–50% of a flow quantity of water in a condition where there is not any clog in the discharge conduits, for maintaining the lighting of the indication lamp 103 if the answer is "YES" and for maintaining the indication lamp 103 in its turn-off condition if the answer is "NO". (see a flow chart shown in FIG. 5)

The alarm buzzer 104 is activated in response to operation of the manual changeover switch 102 and is deactivated when the flow passage changeover valve 50 is switched over by operation of the manual changeover switch 102. The alarm buzzer 104 is also deactivated when the production time t2 of electrolyzed water becomes a predetermined time T3 after the flow of water is detected by the flow quantity sensors 81, 82. In this case, the time T3 is determined in about one minute taking into consideration an actual time during which alkaline water and acid water discharged from the flow passage changeover valve 50 are drained from the faucets 43, 44 and 45, 46.

Assuming that in the production system of electrolyzed water, the main cock 26 has been opened in a condition wherein the faucets 43, 44 and 45, 46 are closed and that the main switch 101 of the electric control device 100 has been turned on, alkaline water and/or acid water is produced by electrolysis of the city service water and used in an appropriate manner at the following operation modes described with reference to FIGS. 2–6.

Figure 2:
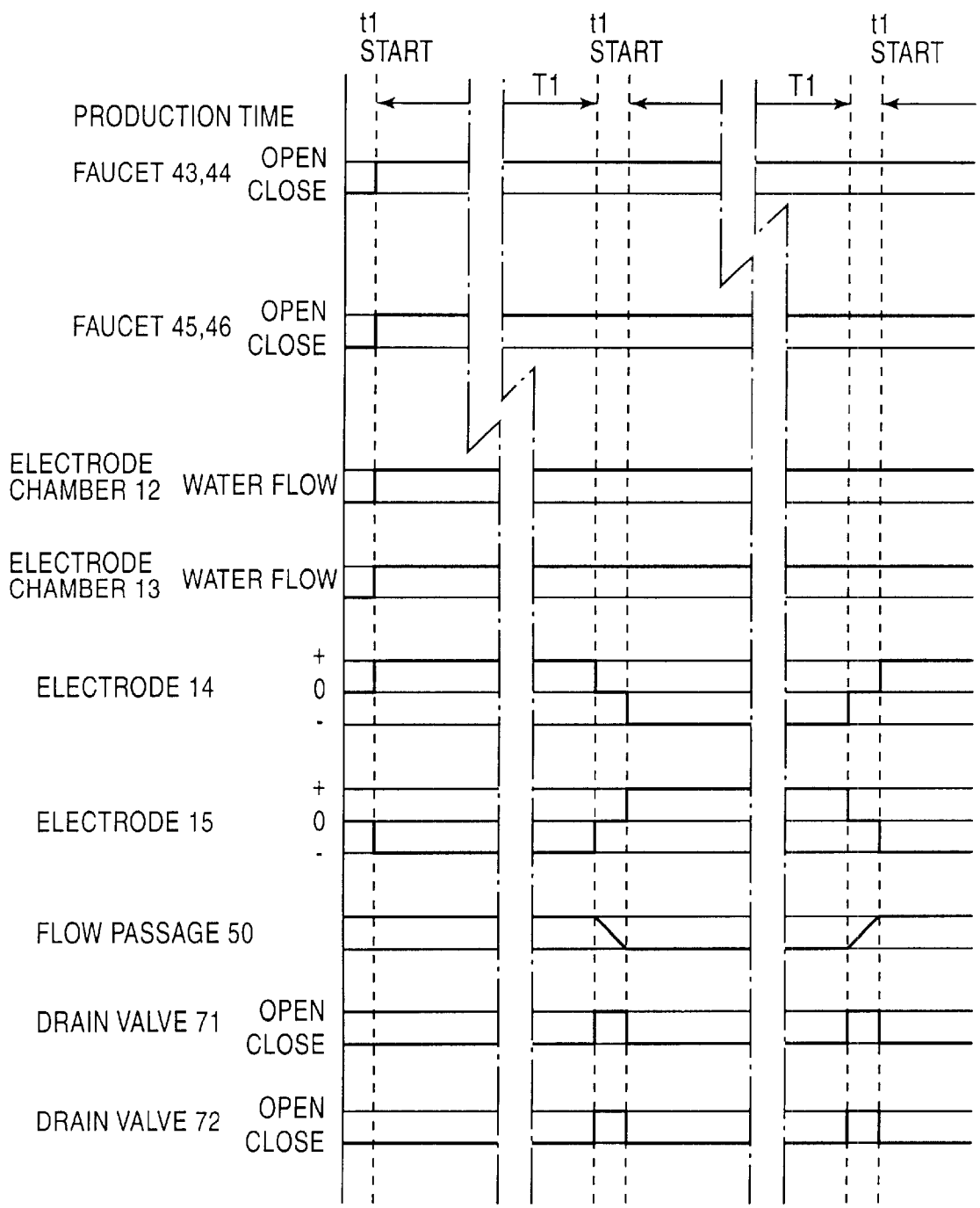
FIG. 2 illustrates a operation mode of the production system in continuous use of alkaline water and acid water.

Illustrated in FIG. 2 is an operation mode of the production system of electrolyzed water in continual use of both the alkaline water and acidic water. This operation mode is effected when at least one of the faucets 43 and 44 and at least one of the faucets 45 and 46 are opened. At this operation mode, the city service water under pressure is supplied into the water supply conduit 24 from the city service water conduit 27 through the water purifier 25 and pressure reduction valve 23 and supplied into the electrode chambers 12, 13 from the water supply conduit 24 through inlet conduits 21, 22. When the flow of city service water is detected by the flow quantity sensors 81, 82, the electric control device 100 activates the electrodes 14, 15 in response to a detection signal applied from the sensors 81, 82 and maintains the drain valves 71, 72 in their closed positions. Thus, the alkaline water and acidic water are produced by electrolysis of the city service water in the electrolyzer 10 and discharged through the flow passage changeover valve 50 positioned as shown by solid line in FIG. 1, the discharge conduits 41, 42, and the faucets 43 or 44 and 45 or 46 maintained in their open positions.

When the production time of electrolyzed water measured by the integration timer (not shown) becomes the predetermined time T1, the polarity of electrodes 14, 15 and the position of flow passage changeover valve 50 are switched over under control of the electric control device 100. In such operation, the drain valves 71, 72 are opened and maintained in their open positions. The inversion in polarity of electrodes 14, 15 is effected in response to operation of the changeover valve 50. In this instance, the power supply to electrodes 14, 15 is cut off under control of a polarity changeover device (not shown) when the changeover valve 50 is switched over and is resumed when the changeover valve 50 has been switched over. The switchover operation of changeover valve 50 is effected by activation of an electric motor (not shown) upon lapse of the predetermined time T1 and finishes after lapse of a predetermined period (about 5 seconds). The operation of the changeover valve 50 is detected by a position sensor (not shown). In response to a detection signal applied from the position sensor, the power supply to electrodes 14, 15 is resumed under control of the electric control device 100, and the drain valves 71, 72 are closed and maintained in their closed position. At this time, the integration timer for measurement of the production time t1 of electrolyzed water is reset to restart measurement of the production time t1. The foregoing operation is repeated upon each lapse of the predetermined time T1 so that the alkaline water and acid water are continuously discharged from the discharge conduits 41, 42 through the faucets 43 or 44 and 45 or 46.

Figure 4:
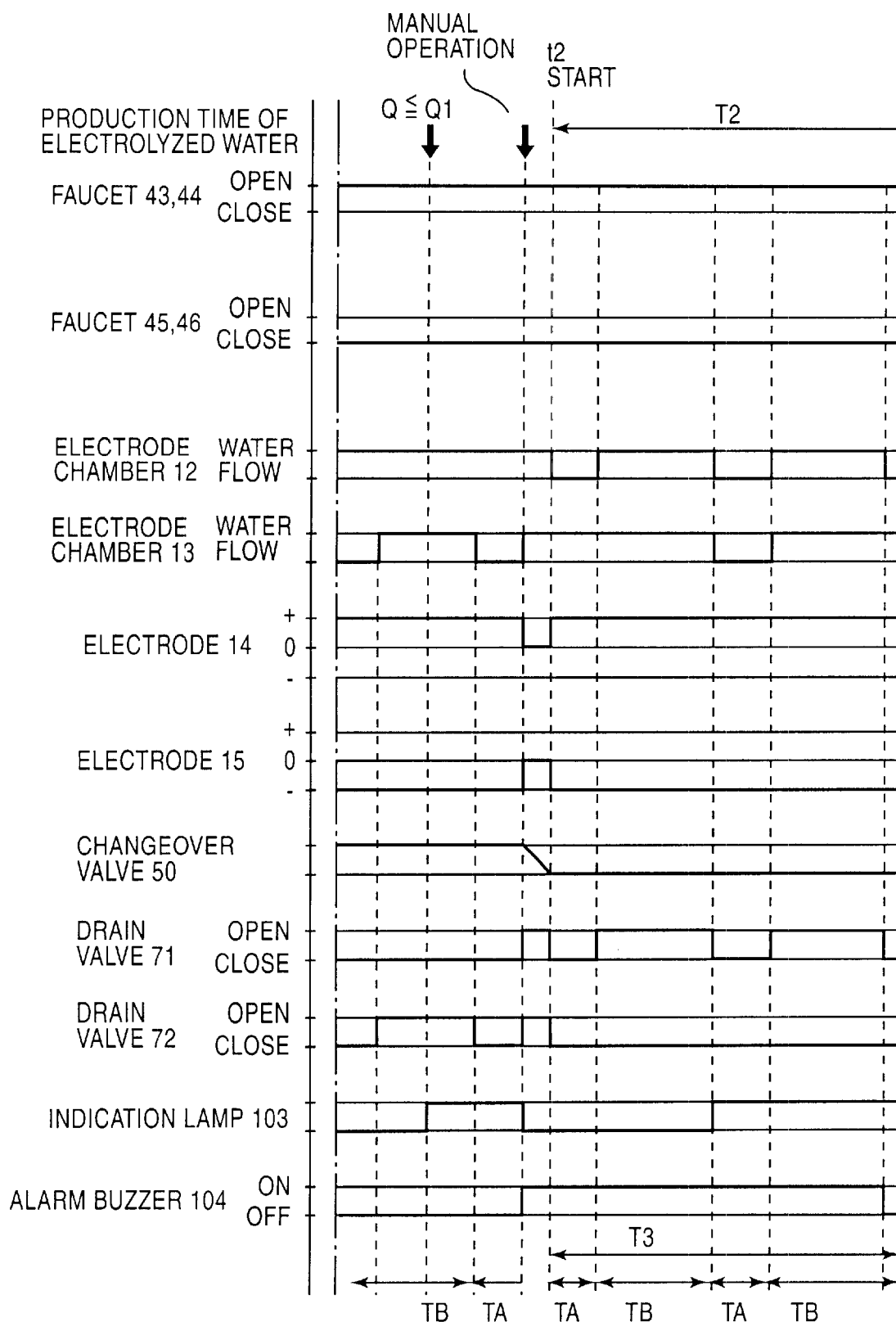
FIG. 4 illustrates an operation mode of the production system in a condition where an indication lamp is put on in continuous use of alkaline water or acid water to inform of clog in discharge conduits of the alkaline water.
Figure 5:
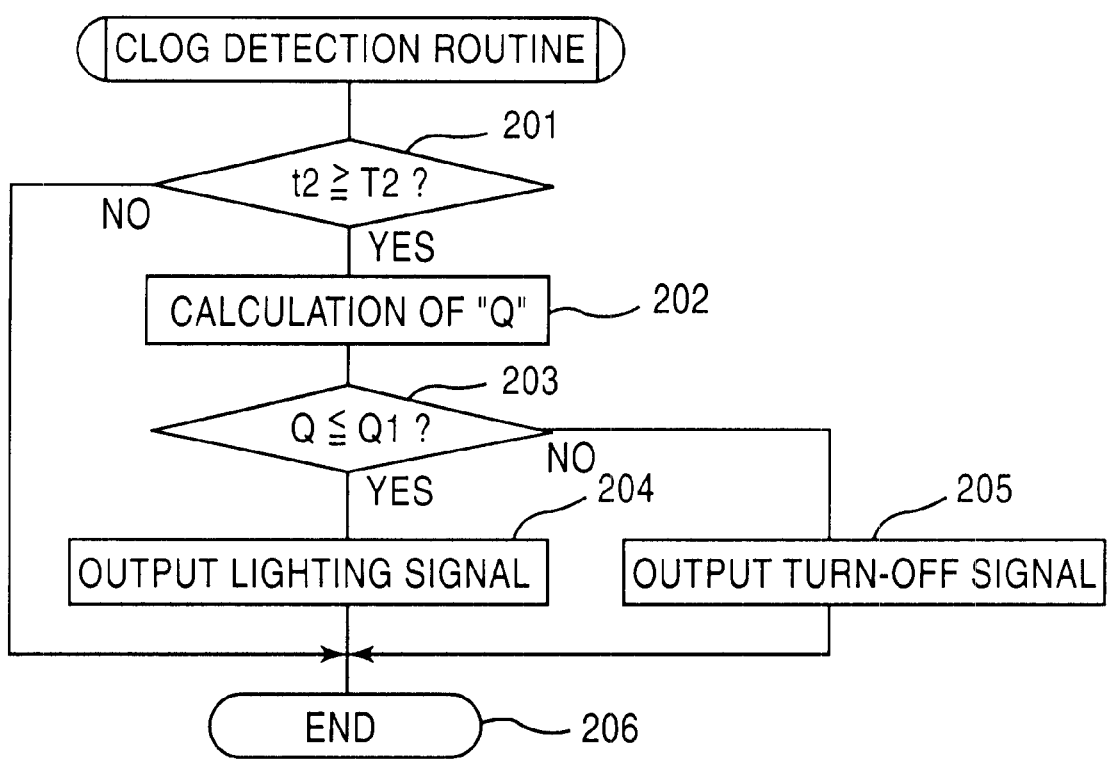
FIG. 5 is a flow chart of a control program executed at the operation mode shown in FIG. 4.

Illustrated in FIGS. 3, 4 and 5 is an operation mode of the production system of electrolyzed water in continual use of only the alkaline water or acid water. This operation mode is effected when at least one of the faucets 43 and 44 on the discharge conduit 41 is opened in a condition where the flow passage changeover valve 50 is positioned as shown by solid line in FIG. 1 and where both the faucets 45 and 46 are maintained in their closed position. At this operation mode, the city service water under pressure is supplied into the electrode chambers 14, 15 from the water supply conduit 24, and the flow of city service water is detected by the flow quantity sensor 81. In such an instance, under control of the electric control device 100, the electrodes 14, 15 are activated in response to a detection signal applied from the sensor 81, and the drain valve 72 on the drain conduit 62 bifurcated from the discharge conduit 42 is intermittently opened for a predetermined time TB at a predetermined time interval TA. Thus, alkaline water and acidic water produced by electrolysis of the city service water in the electrolyzer are discharged into the discharge conduits 41, 42 through the outlet conduits 31, 32 and the flow passage changeover valve 50 positioned as shown by the solid line in FIG. 1 and is discharged from the discharge conduit 41 through the faucet 43 or 44. On the other hand, the electrolyzed water is discharged into the drain conduit 63 through the discharge conduit 42, drain conduit 62 and drain valve 72.

When the production time t1 of electrolyzed water measured by the integration timer (not shown) becomes the predetermined time T1, the polarity of electrodes 14, 15 and the position of flow passage changeover valve 50 are switched over under control of the electric controller 100. In such operation, the drain valves 71, 72 are opened and maintained in their open positions The inversion of the polarity of electrodes 14, 15 is effected in response to operation of the changeover valve 50 under control of the polarity changeover device (not shown). In this instance, the power supply to electrodes 14, 15 is cut off when the changeover valve 50 is switched over and is resumed when the changeover valve 50 has been switched over. The switchover operation of changeover valve 50 is effected by activation of the electric motor (not shown) upon lapse of the predetermined time T1 and finishes after lapse of the predetermined lime T1. The operation of the changeover valve 50 is detected by the position sensor (not shown). In response to a detection signal applied from the position sensor, the power supply to electrodes 14, 15 is resumed, and the drain valves 71, 72 are closed. At this time, the integration tuner for measurement of the production time t1 of electrolyzed water is reset to restart measurement of the production time t1. The foregoing operation is repeated upon each lapse of the predetermined time T1 so that the alkaline water or acidic water is continuously discharged from the discharge conduits 41 through the faucet 43 or 44.

When the drain valves 71, 72 are intermittently opened, a detection routine for detection of clog in the discharge conduits shown in FIG. 5 is executed by the computer of control device 100 at each lapse of the predetermined time TB as described hereinafter. At step 201, the computer of control device 100 determines whether a production time t2 of electrolyzed water measured by the integration timer (not shown) is more than a predetermined time T2 or not. If the answer is "NO", the computer of control device 100 finishes the execution of the program at step 206. If the answer at step 201 is "YES", the computer of control device 100 executes processing at step 202 and 203. The predetermined time T2 is defined taking into consideration a time during which an amount of scale deposited due to alkaline water flowing through the discharge conduit 41 or 42, drain conduit 61 or 62 and drain valve 71 or 71 prior to switchover operation of the flow passage changeover valve 50 is dissolved and washed by acid water and during which the flow quantity Q of water detected by sensor 81 or 82 becomes more than a predetermined quantity Q1.

When the program proceeds to step 202, the computer of control device 100 calculates a flow quantity Q of water supplied through the inlet conduits 21, 22 in response to a detection signal applied from the flow quantity sensors 81, 82 and causes the program to proceed to step 203. At step 203, the computer of control device 100 determines whether the flow quantity Q of water is less than or equal to the predetermined quantity Q1 or not. If the answer at step 203 is "YES", the program proceeds to step 204 where the computer of control device 100 issues a lighting signal for maintaining the indication lamp 103 in its lighted condition. If the answer at step 203 is "NO", the program proceeds to step 205 where the computer of control device 100 issues a turn-off signal for maintaining the indication lamp 103 in its put out condition. Thus, the fact that an amount of scale deposited due to alkaline water flowing through the discharge conduit 41 or 42, drain conduit 61 or 62 and drain valve 71 or 72 became more than a permissible amount can be forecasted on a basis of the flow quantity Q of water detected by sensors 81, 82. With such forecast, the indication lamp 103 is put on under control of the computer to draw the user's attention to operation of the manual changeover switch 102.

When the manual changeover switch 102 is operated by the user, the indication lamp 103 is put off, and the alarm buzzer 104 starts to operate. In such an instance, the flow passage changeover valve 50 is switched over in a condition where the drain valves 71, 72 are maintained their open position, and the electric power supply to the electrodes 14, 15 is cut off. The switchover operation of changeover valve 50 is effected by activation of the electric motor (not shown) in response to the operation of manual changeover switch 102 and finishes upon lapse of a predetermined time. The switchover operation of changeover valve 50 is detected by the position sensor (not shown). In response to a detection signal applied from the position sensor, the electric power supply to electrodes 14, 15 is resumed under control of the computer of control device 100, and the drain valves are closed and maintained in their closed positions. At his time, the integration timer for measurement of the production time to of electrolyzed water is reset to restart measurement of the production time t2. Thereafter, alkaline water and acid water produced in the electrolyzer are continuously discharged through the discharge conduit 41 and faucet 43 or 44 in a condition where the discharge place of alkaline water or acidic water was inverted. In addition, the alarm buzzer 104 is deactivated upon lapse of a predetermined time T3 after the changeover valve 50 was switched over in response to the operation of manual changeover switch 102.

Figure 6:
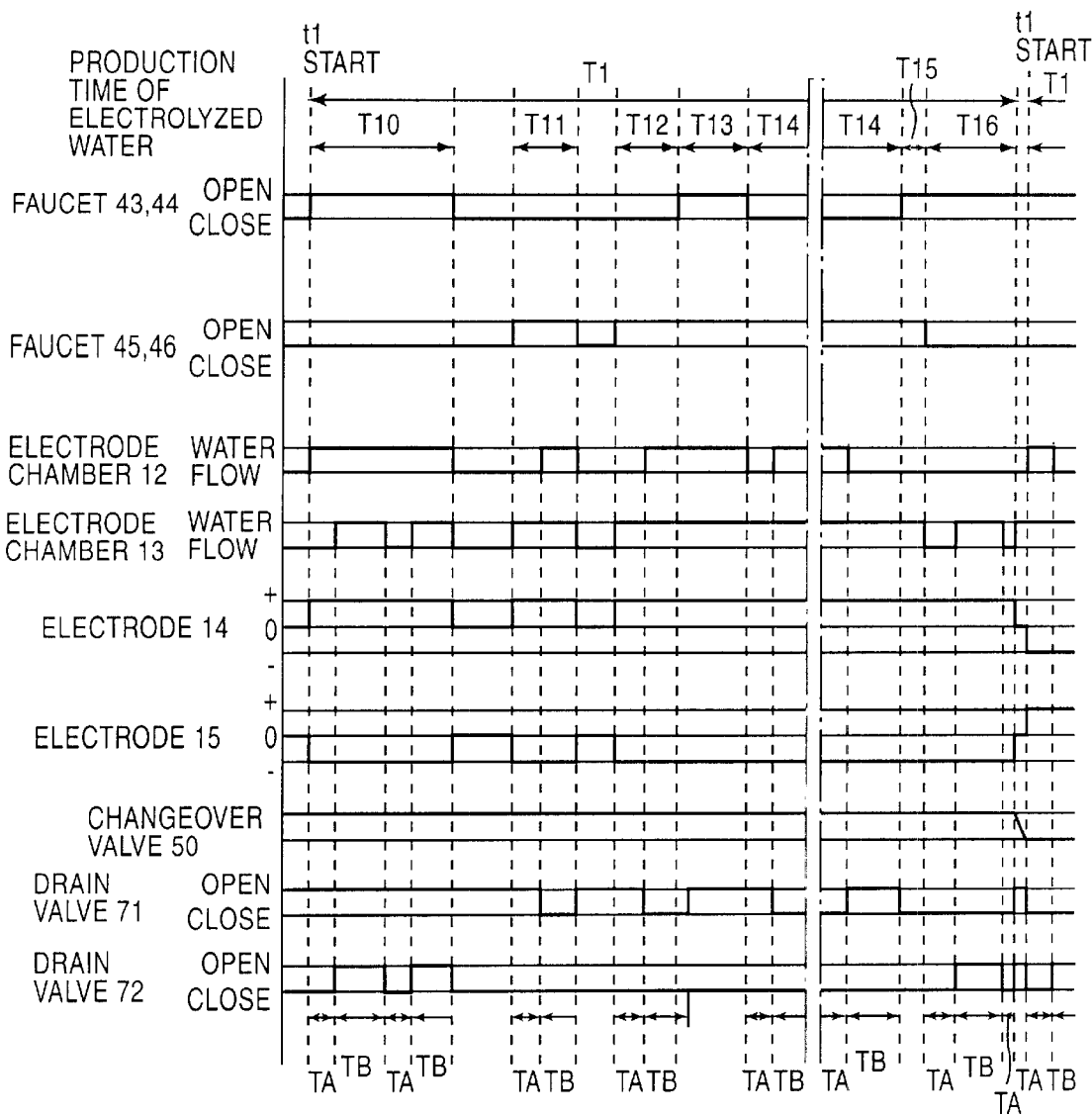
FIG. 6 illustrates an operation mode of the production system in appropriate use of alkaline water and acid water.

Illustrated in FIG. 6 is an operation mode of the production system of electrolyzed water in appropriate use of the alkaline water and acid water. This operation will be readily understood from the foregoing description referred to FIGS. 2 and 3. In this instance, each operation of the indication lamp 103 and manual changeover switch 102 will be readily understood from the foregoing description referred to FIGS. 4 and 5.

In the embodiment described above, the polarity of electrodes 14, 15 and the position of flow passage changeover valve 50 are simultaneously switched over upon each lapse of the predetermined time T1 under control of the computer of control device 100, and the position of flow passage changeover valve 50 is switched over in response to operation of the manual changeover switch 102 under control of the computer of control device 100. Accordingly, in a condition where the polarity of electrodes 14, 15 and the position of flow passage changeover valve 50 are simultaneously switched over, the alkaline water is discharged through either the discharge conduit 41 or 42 while the acid water is discharged through the other discharge conduit 42 or 41. As a result, an amount of scale is deposited in the discharge conduit through which the alkaline water is continuously discharged However, when only the position of flow passage changeover valve 50 is switched over in response to operation of the manual changeover switch 102, the acid water is discharged through the discharge conduit through which the alkaline water was discharged before the position of changeover valve 50 is switched over, while the alkaline water is discharged through the discharge conduit through which the acid water was discharged before the position of changeover valve 50 is switchers over. As a result, the scale deposited in the discharge conduit is dissolved and washed by the acid water after the position of changeover valve 50 was switched over. This is useful to eliminate the scale deposited in the discharge conduit thereby to maintain the passage of the discharge conduit in a good condition. It is, therefore, apparent that if each discharge place of the alkaline water and acid water is changed from the discharge conduit 41 to the discharge conduit 42 and vice versa, the alkaline water and acid water can be discharged in a good condition for a long period of time.

In the embodiment described above, clog caused by an amount of scale deposited in the discharge conduit 41 or 42, drain conduit 61 or 62 and drain valve 71 or 72 is detected by processing at step 203 of FIG. 5, and the indication lamp 103 is put on under control of the computer of control device 100 to inform the user of clog in the conduits and drain valve. In addition, the lighting of the indication lamp 103 is prohibited by processing at step 201 of FIG. 5 until the production time t2 of electrolyzed water becomes the predetermined time T2 after the changeover valve 50 was switched over. This is useful to avoid useless lighting of the indication lamp 103.

In the embodiment, the position of flow passage changeover valve 50 is switched over in a condition where both the drain valves 71, 72 are maintained in their open positions. This is useful to prevent excessive water pressure acting on the membrane 11 in the electrolyzer 10 thereby to prevent damage of the membrane 11. In this instance, the position of changeover valve 50 is switched over in response to the detection signal applied from the flow quantity sensors 81, 82 to avoid switchover operation of the changeover valve 50 in a condition where the drain valves 71, 72 may not be opened due to an error in operation.

In the embodiment the buzzer 104 is activated until the production time t2 of electrolyzed water becomes the predetermined lime T3 after the manual changeover switch 102 was operated by the user. This is useful to prevent erroneous use of the alkaline water and acid water inappropriate in property discharged from the discharge conduits 41, 42 immediately after the changeover valve 50 was switched over.

Although in the embodiment, the indication lamp 103 is provided to inform the user of an optimal timing for operation of the manual changeover switch 102, the indication lamp 103 may be replaced with an alarm means such as a buzzer. In such a case, tie computer of control device 100 is programmed to issue an alarm maintaining signal at step 204 of FIG. 5 and to issue an alarm prohibiting signal at step 205. Thus, the alarm means is activated to inform the user of clog in the discharge conduits, drain conduits or drain valves so that the manual changeover switch is operated by the user at an optimal timing.

Although in the embodiment, only the flow passage changeover valve 50 is switched over in response to operation of the manual changeover switch 102, the changeover valve 50 may be switched over when a "YES" answer is determined at step 203 of FIG. 5. In such a case, the alkaline water is discharged alternately through the discharge conduits 41 and 42 at each time when the "YES" answer is determined at step 203 of FIG. 5. Thus, the scale deposited in the discharge. conduits 41, 42, drain conduits 61, 61 and drain valves 71, 72 can be automatically removed. This facilitates the maintenance management of the production system of electrolyzed mater. In addition, the processing at step 202–203 of FIG. 5 may not be executed until the production time t2 of electrolyzed water becomes the predetermined time T2 after the changeover valve was switched over. This is useful to avoid useless operation of the changeover valve 50. In such a case, it is preferable that indication means for informing the user of the kind of electrolyzed water are provided adjacent the faucets 43, 44, 45, 46. For example, a blue lamp may be provided adjacent the faucets capable of discharging the alkaline water, while a red lamp may be provided adjacent the faucets capable of discharging the acid water.

Although in the embodiment, the flow passage changeover valve 50 is switched over in response to operation of the manual changeover switch 102, the polarity of electrodes 14, 15 may be inverted in response to operation of the manual changeover switch 102. Furthermore, although in the embodiment, at least one of the faucets 43 and 44 on the discharge conduit 41 is opened in a condition where both the faucets 45, 46 were closed, and the drain valve 72 on the drain conduit 62 bifurcated from the discharge conduit 42 is intermittently opened for water saving, the drain valve 72 may be continuously opened.

What is claimed is:

1. A production system of electrolyzed water comprising:
an electrolyzer of a flow-down type having positive and negative electrodes respectively provided in a pair of electrode chambers subdivided by a partition membrane;
a pair of inlet conduits connected to the electrode chambers of the electrolyzer for supplying treatment water into the electrode chambers;
a pair of outlet conduits connected to the electrode chambers for discharging alkaline water and acid water produced by electrolysis of the treatment water in the electrode chambers;
a pair of discharge conduits each provided with a faucet at their outlet ends;
a flow passage changeover valve disposed between the outlet conduits and discharge conduits for switching over the flow passage of alkaline water and acid water discharged from the outlet conduits into the discharge conduits;
a pair of drain conduits respectively bifurcated from the discharge conduits between the changeover valve and the faucets;
a pair of drain valves provided on the drain conduits;
a pair of flow quantity sensors provided on the inlet conduits for detecting a quantity of the treatment water flowing therethrough into the electrode chambers;
a control means for applying an electric power to the electrodes in response to a detection signal applied from the flow quantity sensors when at least one of the faucets on the discharge conduits was opened and opening the drain valve on the drain conduit bifurcated from the discharge conduit the faucet of which is closed;
detection means for detecting clog in the discharge conduits when a quantity of treatment water detected by the flow quantity sensors is less than a predetermined quantity;
switchover means for switching over only the position of the flow passage changeover valve or the polarity of the electrodes when the clog in the discharge conduits was detected by said detection means; and
indication means for indicating the clog in the discharge conduits detected by said detection means.

2. A production system of electrolyzed water as claimed in claim 1, wherein said indication means is replaced with alarm means for informing a user of the clog in the discharge conduits detected by said detection means.

3. A production system of electrolyzed water as claimed in claim 2, further comprising means for prohibiting activation of said indication means or said alarm means until the production time of electrolyzed water becomes a predetermined time after only the position of the changeover valve or the polarity of the electrodes was switched over.

* * * * *